(12) United States Patent
Chien et al.

(10) Patent No.: US 7,756,883 B2
(45) Date of Patent: *Jul. 13, 2010

(54) CONTROL METHOD FOR MODIFYING ENGINEERING INFORMATION FROM A REMOTE WORK SITE AND A SYSTEM OF THE SAME

(75) Inventors: Jung-Mao Chien, Tao Yuan (TW);
Jenn-Sheng Wu, Hsin Chu (TW);
Ming-Hsiung Chang, Hsin Chu (TW);
Mei-Hui Chen, Tai Chung Hsien (TW)

(73) Assignee: Industrial Technology Research Institute, Hsinchu County (TW)

( * ) Notice: Subject to any disclaimer, the term of this patent is extended or adjusted under 35 U.S.C. 154(b) by 986 days.

This patent is subject to a terminal disclaimer.

(21) Appl. No.: 11/298,662

(22) Filed: Dec. 12, 2005

(65) Prior Publication Data

US 2007/0136300 A1  Jun. 14, 2007

(51) Int. Cl.
*G06F 17/30* (2006.01)
(52) U.S. Cl. .................. 707/758; 707/803; 707/805; 707/781; 707/782; 707/783
(58) Field of Classification Search .............. 707/7, 707/10; 705/7
See application file for complete search history.

(56) References Cited

U.S. PATENT DOCUMENTS

| | | | |
|---|---|---|---|
| 7,062,514 B2 * | 6/2006 | Harris | 707/104.1 |
| 2006/0010024 A1 * | 1/2006 | Eguchi | 705/8 |
| 2006/0271477 A1 * | 11/2006 | Allin et al. | 705/40 |
| 2007/0112788 A1 * | 5/2007 | Kobza et al. | 707/10 |
| 2007/0294617 A1 * | 12/2007 | Kroeger | 715/530 |

FOREIGN PATENT DOCUMENTS

| | | |
|---|---|---|
| TW | 580633 | 3/2004 |
| TW | 591463 | 6/2004 |
| TW | 595214 | 6/2004 |

* cited by examiner

*Primary Examiner*—Baoquoc N To
(74) *Attorney, Agent, or Firm*—Rabin & Berdo, P.C.

(57) ABSTRACT

A control method for modifying information concerning a remote work site includes: (i) setting up a database that comprises information concerning a remote work site; (ii) using an electronic device that has an image-capturing unit, in order to capture images of equipment or construction sites at the remote work site; (iii) communicating with an access platform and an option menu arranged on the access platform via an Internet connected module, creating an issue in a network database via the electronic device with an Internet browser and accessing information about the issue via the option menu that allows access to the database according to an authority level of a user; or creating an issue directly on a network database via an network connected module; and (iv) modifying the information in accordance with the issue of the images from the remote work site.

16 Claims, 2 Drawing Sheets

CONTROL METHOD FOR MODIFYING ENGINEERING INFORMATION FROM A REMOTE WORK SITE AND A SYSTEM OF THE SAME

BACKGROUND OF THE INVENTION

1. Site of the Invention

The present invention relates to a control method for modifying engineering information from a remote work site and a system of the same, and in particular a control method for modifying engineering information from a remote work site and a system of the same that shortens work times and reduces costs.

2. Background of the Invention

Working in a remote place or being away from a work place causes many issues to arise. When this happens, often the person most qualified to advise upon or solve the issues is not where the issue has occurred, so questions cannot be answered quickly. This is particularly true in the case of engineering projects, often the construction manager, key planner, or architect is needed to solve an issue.

Furthermore, paper records about modifications are the standard method by which modifications are tracked. However, mistakes or the misplacement of these papers cause further errors to occur and increase a project's working time. Such issues only become more problematic when an issue cannot be solved immediately. What's more, after a project is completed, substantial parts of the plans, such as the drawings or engineering data, are often different from those of the original specifications. Naturally, this affects the quality of the project and slows down its completion.

Likewise, in a factory, if a piece of equipment is broken and needs to be fixed, labor hours will be wasted, efficiency will be reduced, and costs will be increased.

If there was a way for, as examples, construction managers, architects or repairmen, to offer feedback, answer questions and tell others the appropriate course of action to take immediately and easily, this would reduce the amount of time lost and ensure that, again as an example, the actual construction and the original construction plans more accurately resembled each other, or that a piece of broken machinery on a production line could be repaired quickly. Such a method would obviously be of great benefit to many people, organizations and companies, saving them both money and time.

With respect to Taiwan Patent 580633, titled "Method for revising specifications and system of the same", and Taiwan Patent 591463, titled "System for controlling projects and method of the same", both of these prior arts disclose a central control unit, a documentation-managing unit, and an Internet browser connecting with a documentation-managing unit. However, during a real operation, operators record all of the steps on paper. The paper copies are then delivered to the project manager at a later date. The project manager completes the papers and makes an overall plan that is then sent to the original planner so that modifications can be made to the project's plans. This method involving multiple levels often delays the timing of revisions and results a number of errors to be made. Furthermore, both prior arts are only applicable within a single company—not between different companies or contractors. They are also provided with the same login window for every user without allowing access to different information (say for example construction plans, personnel contact details or budget information). Furthermore, both prior arts also use custom-made interfaces, thereby incurring additional costs to users.

SUMMARY OF THE INVENTION

A control method for modifying engineering information from a remote work site and a system of the same are provided. This enables, for example, engineering information to be controlled and modified in real-time through the use of digital files (such as text files, digital images, audio files and movies, etc). Through the use of these convenient forms of communication a production schedule can be shortened and costs reduced.

A control method for modifying engineering information from a remote work site and a system of the same are provided for a construction firm or a company operating in tandem with a third party.

A control method for modifying engineering information from a remote work site and a system of the same are provided for users according to their authority level.

A control method for modifying engineering information from a remote work site and a system of the same that use an Internet browser that does not have a customized design are provided.

A control method for modifying engineering information from a remote work site and a system of the same are provided for feeding issues back to a central device that allows inquiries to be made in real time from a remote work site.

A control method for modifying engineering information from a remote work site and a system of the same are provided that assist in resolving issues at a remote work site quickly, thereby saving time and money.

A control method for modifying engineering information from a remote work site and a system of the same are provided, every event thereof can be recorded.

A control method for modifying engineering information from a remote work site is provided and designed especially with engineering work in mind. When issues on a construction site or with a piece of machinery need to be solved, an image-capturing unit (such as a digital camera or a digital movie camera) can be used to record information regarding an issue. That information about the image, a location, and a construction site or a piece of machinery can then be sent via an Internet connected device to a central device. This central device relays information to at least one person responsible for that issue (on a construction project for example, this may be the project manager of a prime/primary contractor or a planner of an end/third party contractor). That person can then examine the issue. Staff at the remote work site can then be quickly informed of the most suitable course of action to take. Further inquires can also be made by staff where necessary.

A control method for modifying engineering information from a remote work site comprises: setting up a database on a network; capturing images via an image-capturing unit and uploading the images to the database via an electronic device; enabling an Internet connected module (for example, an Internet browser) inside the electronic device to communicate with an access platform via the network; providing a login page in the access platform to verify the authority level of the user; and finally creating an issue on the network database. Alternatively, a user at a remote work site can create an issue directly on the network database via a network-connected module arranged inside the electronic device without the login window. Once the user has connected to the network, an issue about the image, a location, a construction site or a piece of machinery can then be created on the database. Wherein the step of creating the issue includes: setting up location codes for a construction site or a piece of machinery, uploading an image, and storing the image on the network database.

Any prior engineering information can thus be modified in accordance with the location codes and the images.

A control system for modifying engineering information from a remote work site includes: an Internet connected module (using a browser such as Microsoft Explorer or Netscape Navigator), a network-connected module, an access platform, a service platform and an image-capturing unit. The network-connected module contacts a database arranged inside the service platform directly for sending, receiving and displaying information. The Internet connected module contacts a database via the Internet for sending, receiving and displaying information via the access platform after verifying the identity of the user. The access platform communicates with the Internet connected module via an Internet browser and provides Web service in accordance with HTTP protocol. Moreover, the access platform includes an authority access module providing a login window for certifying the authority level of a user, and an option menu providing a web page next to the login window and containing corresponding information. The service platform communicates with the authority access module, and includes a plurality of optional units (menu options??) and a database connected to the optional units. In this way, the user may communicate with the authority access module and view information corresponding to their authority level. Furthermore, the optional units providing the information are accessible via the option menu. The Internet connected module and the network module are disposed in an electronic device (such as a laptop computer or a PDA), and the image-capturing unit is relative to the electronic device. Images and information can then be uploaded to the database thereby. The image-capturing unit captures images of a construction site or a piece of machinery at the remote work site. The images are then stored in the database via the access platform and a corresponding optional unit in the service platform.

To provide a further understanding of the invention, the following detailed description illustrates embodiments and examples of the invention. Examples of the more important features of the invention have thus been summarized rather broadly in order that the detailed description thereof that follows may be better understood, and in order that the contributions to the art may be appreciated. There are, of course, additional features of the invention that will be described hereinafter which will form the subject of the claims appended hereto.

BRIEF DESCRIPTION OF THE DRAWINGS

These and other features, aspects, and advantages of the present invention will become better understood with regard to the following description, appended claims, and accompanying drawings, wherein:

DETAILED DESCRIPTION OF THE EMBODIMENTS

Figure 1:
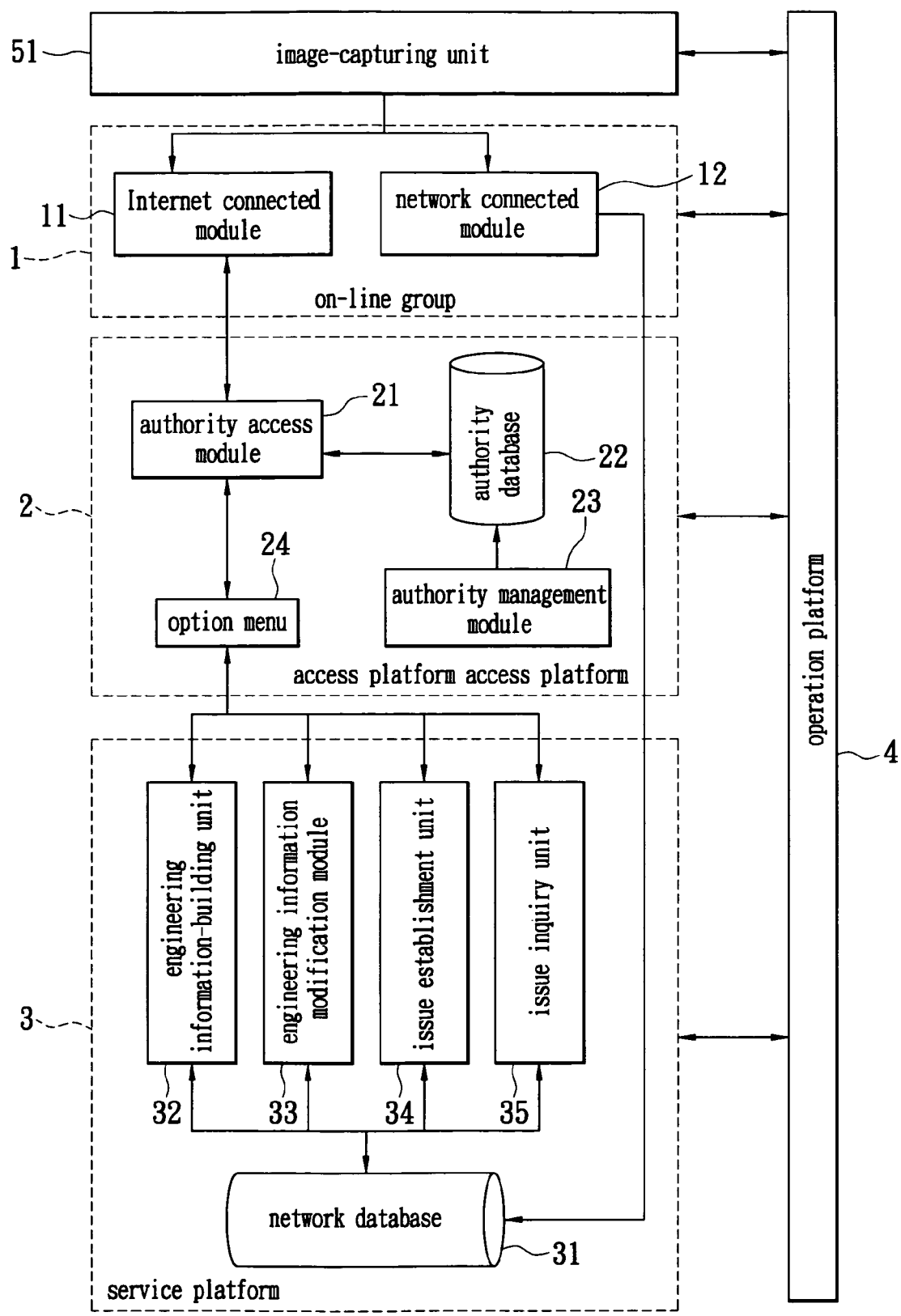
FIG. 1 is a diagram of a control system for modifying engineering information from a remote work site according to the present invention.

Referring to FIG. 1, a diagram of a control system for modifying engineering information from a remote work site according to the present invention is provided. The control system can be constructed using a 3-Tier or an N-Tier structure. The control system includes an on-line group 1 having an electronic device, an access platform 2, a service platform 3, an operation platform 4, and an image-capturing unit 51. The on-line group 1 includes an Internet connected module 11 and a network connected module 12. The Internet connected module 11 is provided for receiving data from a user, and connects the access platform 2 to the Internet in order to transmit and access information therebetween. The Internet connected module 11 further displays information from the access platform 2 on a display screen. The Internet connected module 11 is a browser that is installed on the electronic device in advance. The Internet connected module 11 connects to the access platform 2 via the network and verifies the authority level of the user via a login window. In addition, the Internet connected module 11 includes a built-in browsing program, and has a wired or wireless connection. The network connected module 12 is also used to receive data from the user, and connects with a network database 31 directly without the login window via the Internet for transmitting information. The network connected module 12 can also have a wired or wireless connection.

The access platform 2 connects to the Internet connected module 11 and provides a Web service in accordance with HTTP protocol for serving and controlling information. In this way, required information will be displayed on the Internet connected module 11 of the electronic device. The access platform 2 includes an authority access module 21 that certifies the authority level of the user, an option menu 24 communicating with the authority access module 21 and provides services corresponding to the authority level of the user, an authority database 22 connected with the authority access module 21, and an authority management module 23 for controlling and capturing the authority level of the user in the authority database 22. The authority management module 23 stores the user's access and authority information in the authority database 22 in advance. As such, the user's identity can be verified according to the authority information. The authority access module 21 verifies users in a single-sign-on manner to control who can access a network database 31. The option menu 24 of the access platform 2 meets at least the standards of JSR (Java Specification Request) 168 or WSRP (Internet services for Remote Portlets), so that the option menu 24 can provide a corresponding service in accordance to the authority information stored in the authority database 22.

The service platform 3 communicates with the option menu 24 of the access platform 2, and includes a plurality of optional units 32~35 and a network database 31 connected to the optional units 32~35. The network database 31 is used to access the optional units 32~35. Each of the optional units 32~35 are accessible depending on the authority level of the user to the corresponding option menu 24. The network database 31 of the service platform 3 includes database information or electronic documentation information (for example, engineering plans, specifications, drawings, electronic control data, location codes of equipment, planners, email addresses and phone numbers of the planners). The optional units 32~35 include an engineering information-building unit 32, an engineering information modification module 33, an issue establishment unit 34 that can create an issue regarding a construction site or a piece of machinery, and an issue inquiry unit 35. The engineering information-building unit 32 provides original engineering information stored in the network database 31 at the beginning of a project. The engineering information modification module 33 sets up engineering information that requires modification. The issue establishment unit 34 inputs engineering information that requires modification and creates issues concerning engineering information, such as construction, assembly or testing procedures. The issue inquiry unit 35 can be used to check at what stage the issue is at, meaning that the issue inquiry unit 35 can be checked to see how resolution of the issue is progressing.

The operation platform 4 is connected with the on-line group 1, the access platform 2 of the central device and the service platform 3. The operation platform 4 can be adapted for different operating systems and selected depending on the collocation of hardware among the on-line group 1, the access platform 2 and the service platform 3. The operation platform 4 provides protocol in order to (allow/enable communication between) the Internet connected module 11 the access platform 2 and to (allow/enable communication between) the network connected module 12 the network database 31.

The real-time image-capturing unit 51 connects to the Internet connected module 11 and the corresponding network connected module 12. The real-time image-capturing unit 51 provides images, including still images with additional layers of text and/or drawings on top of the still images, or movies with audio files attached. Therefore, the real-time capturing unit 51 catches images of equipment or work sites at the remote work site. The images are then stored in the network database 31 via the access platform 2 and the corresponding one of the optional units 32~35 of the service platform. Otherwise the images can be stored directly in the network database 31 via the network connected module 12.

Figure 2:
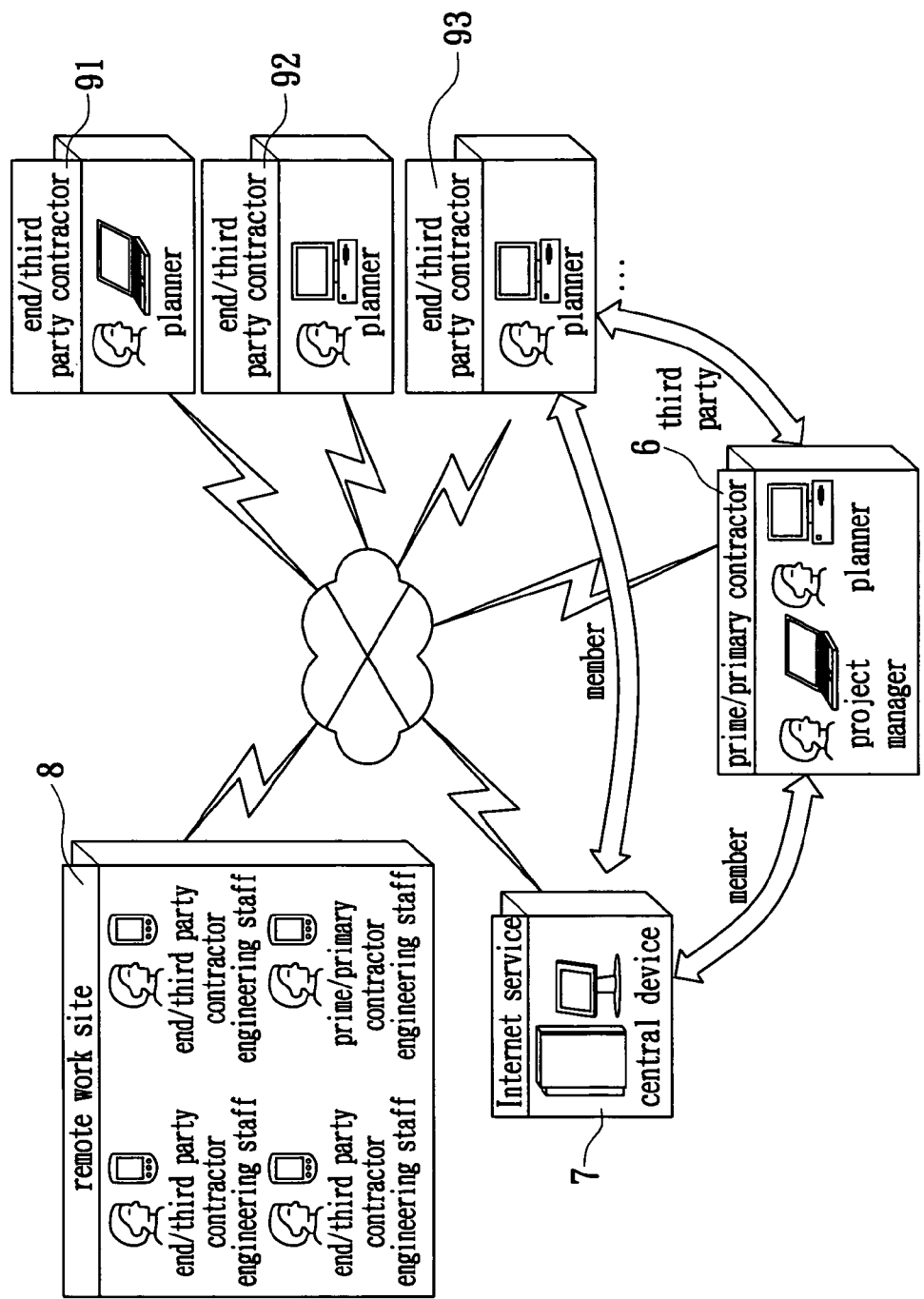
FIG. 2 is a homepage of a control method for modifying engineering information from a remote work site according to the present invention.

Referring to FIG. 2, a homepage of a control method for modifying engineering information from a remote work site according to the present invention is provided. The control method is adapted for engineering staff. When equipment or a construction site at a remote work site has an issue, an image-capturing unit 51 arranged on a portable electronic device can capture images of the equipment or the construction site. Information concerning locations and images of the equipment or the construction site can be sent to a central device 7 provided with/connected to an Internet service, and the central device 7. Alternatively, the electronic device informs at least one project manager 6 or planners 91~93 via an SMS message or an email. Next, the project manager 6 or the planners 91~93 connect to the central device 7 via an electronic device in order to view an issue about equipment or a construction site. Engineering staff 8 will be informed after the issue is resolved, and can later check to see how the resolution of the issue is progressing via the electronic device. The Internet service provider can tally in accordance with the service level (The Internet service provider can record the number of times a user accesses the central device in accordance with their service(authority) level. If the prime/primary contractor possesses/owns/operates the access platform 2, the end/third party contractors can join/access the access platform 2, and the prime/primary contractor can manage/control the end/third party contractor's access to information based upon a level of authority.

The control method for modifying engineering information from a remote work site includes:

(i) a service platform that has a database that includes information (for example, engineering plans, specifications, drawings, electronic control data, equipment codes, names and contact information) that is set up in advance;

(ii) the user at the remote work site uses an electronic device, such as a personal computer, a lap top, a cell phone or a PDA, that is connected to the Internet to access project information; thus, the user can use the electronic device to access a digital file and store the digital file in the electronic device, wherein the digital file can be a text file, a digital photograph (such as JPEG or TIFF files) or a digital movie (such as MPEG, WVA or AVI files); moreover the text file or the digital photograph can be enhanced by adding a layer with a drawing or text on top of the text file or the digital photograph, and the digital movie file can be enhanced by attaching an audio file that can be played simultaneously with the digital movie; in this way information and ideas can be transmitted easily between different parties at different locations;

(iii) the electronic device is connected to the Internet via a wired or a wireless connection, and a browser (such as Microsoft Explorer or Netscape Navigator) communicates with a access platform; the user accesses the access platform via a Internet connected module disposed in the electronic device;

(iv) a homepage of the access platform/login window is displayed on the browser, the user logs in to gain access to information stored on the database;

(v) the user's identity is verified by the log in function, the user's identity is verified by comparison with a user code and a password provided by the user with a predetermined user code and password stored in the authority database; if the user code and/or password provided by the user is incorrect, or if the user is not allowed to access any of the information stored on the database, the user is sent to a generic web page; alternatively, if the user is allowed to access information stored on the database, a corresponding web page is displayed;

(vii) the corresponding web page displays information for the user; the user may either add information (such as adding a layer with a drawing or text on top of the text file or the digital photograph, or attaching an audio file to a movie file), modify the digital files (such as updating engineering plans, specifications, drawings, electronic control data, equipment codes, names and contact information, etc), or access a help function, as they see fit; and (viii) if the user wants to log out, the connection with the Internet connected module of the electronic device should be terminated; or, if the user still wants to use the system, the connection of Internet connected module of the electronic device should be maintained and the step (vii) should be repeated later.

After step (ii) is finished, the network connected module disposed in the electronic device can connect to the Internet to communicate with the database of the central device for transmitting information.

The step of establishing an issue includes:

(a) If a problem arises on a construction site or if a piece of machinery needs to be fixed, engineering staff can take images of the equipment or the construction site via a electronic device with an image-capturing unit and store the images into the electronic media in the electronic device; engineering staff the input locations of the equipment or the construction site and memos and uploads the information, the issue establishment unit creates an issue, and transforms the locations into location codes, upload the images, and confirms the information and saves it into the database of the service platform; alternatively the network connected module can transform the locations into location codes, upload the images, and confirm these information and save them into the database directly;

(b) when the issue is created, the project manager or the planner is informed via an SMS message or an email, later the project manager or the planner is informed automatically in a regular manner via the service platform (by sending messages or emails or both); a regular manner means please.

(c) starting a determination rule to decide if the prior engineering information should be modified by the project manager or the original planner;

(d) if the prior engineering information shouldn't be modified, the project manager or the original planner sends an SMS message, an email, or both to them to inform the person who created the issue via the an engineering information modification unit; if the prior engineering information should be modified, the project manager or the original planner executes an issue inquiry unit to check the codes, confirm if the images attached to the issue conform to the prior engineering information, revising the prior engineering information according to the images, and updating the revised engineering information into the engineering information modification unit of the service platform;

(e) relevant persons are informed how to resolve the issue regarding the equipment or the construction site; and (f) to see how the resolution of the issue is progressing, the issue inquiry unit can be checked.

The advantages of the control method and system according to the present invention are:

(1) Engineering information can be controlled and changed by capturing real-time images, and as such the schedule can be shortened and costs reduced.

(2) Third parties/A construction firm, or one operating in coordination with a third party, can be provided/can easily access all information suitable to their set level of authority.

(3) Access to different information according to users' different levels of authority can be provided.

(4) A normal Internet browser can be used, therefore the added expensive of a browser with a customized design is eliminated.

(5) Issues can be fed back and checked to see how the resolution of the issue is progressing during real time, while staff work at the remote site.

(6) Problems with equipment or construction issues at a remote work site can be fixed quickly thereby saving time.

(7) Every record thereof can be recorded as history/in a history file.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A control method for modifying engineering information from a remote work site, comprising:
    setting up a service platform that has a network database including engineering information regarding the remote work site via an engineering information-building unit;
    communicating with an access platform having an authority access module via an Internet connected module disposed in an electronic device, the communication pertaining to an issue that has arisen at the remote work site; or transmitting the issue for storage on the network database of the service platform via a network connected module disposed in the electronic device directly;
    posting the issue via an issue establishment unit that communicates with an option menu according to an authority level through the authority access module, wherein the step of posting the issue includes:
        recording images of equipment or a construction site at the remote work site via an image-capturing unit;
        setting up location codes for the equipment or the construction site at the remote work site;
        converting the location codes for the equipment or the construction site via the issue establishment unit or the network connected module; and
        uploading and storing the image on the network database; and
    modifying prior engineering information in accordance with the issue, the location codes, and the images captured at the remote work site via an engineering information modification module.

2. The control method as claimed in claim 1, wherein the step of posting the issue includes:
    informing a project manager or an original planner in real time as the issue is being posted.

3. The control method as claimed in claim 2, wherein the step of posting the issue includes:
    sending an SMS message or an email to the project manager or the original planner automatically via the service platform or the network connected module in real time as the issue is being posted.

4. The control method as claimed in claim 2, wherein the step of posting the issue includes:
    informing the project manager or the original planner in a regular manner via the service platform automatically after the first real time information has been sent.

5. The control method as claimed in claim 1, wherein the step of recording images includes:
    capturing a digital photograph; and
    adding a layer with a drawing or text on top of the digital photograph.

6. The control method as claimed in claim 1, wherein the step of recording images includes:
    capturing a digital movie and adding an audio file that can be played simultaneously with the digital movie.

7. A control method for modifying engineering information regarding a remote work site, comprising:
    setting up a service platform that has a database including engineering information about the remote work site;
    setting up an issue on an engineering information-building unit or a network connected module disposed in an electronic device, storing images of equipment or construction sites at the remote work site on the database, and simultaneously informing a project manager, an original planner, the project manager, or the planner;
    determining whether the engineering information should be modified in a single-sign-on manner; and
    informing a person who presented the issue via an engineering information modification unit when the prior engineering information should be modified,
    wherein the control method further comprises:
        activating an issue inquiry unit;
        confirming whether images pertaining to the issue conform to the prior engineering information, and revising the prior engineering information according to the images; and
        updating the revised engineering information into an engineering information modification unit at the service platform.

8. The control method as claimed in claim 7, further comprising:
    informing the person who presented the issue by the project manager or the original planner via the engineering information modification unit of the service platform when the prior engineering information should not be changed.

9. The control method as claimed in claim 7, further comprising:
    informing relevant persons to fix equipment or a construction site via the engineering information modification unit of the service platform.

10. The control method as claimed in claim 7, further comprising:

checking to see how the resolution of the issue is progressing via the issue inquiry unit.

11. A control method for modifying engineering information regarding a remote work site, comprising:

using an image-capturing unit, disposed in an electronic device, by engineering staff at the remote work site, to capture images relevant to an issue concerning equipment or a construction site disposed at the remote work site, and transmitting the issue to a central device via an Internet browser;

submitting the issue to at least one project manager or planner for resolution via the central device or the electronic device;

checking to see how the resolution of the issue is progressing via the electronic device by engineering staff at the remote work site;

receiving the resolution by the at least one project manager or planner at the central device; and notifying the engineering staff at the remote work site of the resolution, the step of notifying being conducted by sending at least one email or SMS message to the engineering staff with information regarding the issue that has been resolved.

12. The control method as claimed in claim 11, wherein the step of informing at least one project manager or planner includes:

sending an SMS message or an email to the at least one project manager or planner automatically.

13. The control method as claimed in claim 11, wherein the step of informing at least one project manager or planner includes:

informing the at least one project manager or planner in a regular manner via the service platform after the first informing step automatically.

14. The control method as claimed in claim 11, wherein the resolution by the at least one project manager or planner includes a determination by the at least one project manager or planner as to whether engineering information should be modified.

15. The control method as claimed in claim 11, wherein the step of notifying the engineering staff includes:

sending emails to the engineering staff in order to substantially resolve the issue regarding equipment or a construction site, the emails containing information regarding the issue that has been resolved.

16. The control method as claimed in claim 11, wherein the step of notifying the engineering staff includes:

sending SMS messages or emails to engineering staff.

* * * * *